May 7, 1968  J. R. TABOR  3,382,002
ROTARY CUTTER WHEEL TUNNELING MACHINE
Filed July 23, 1965  8 Sheets-Sheet 1
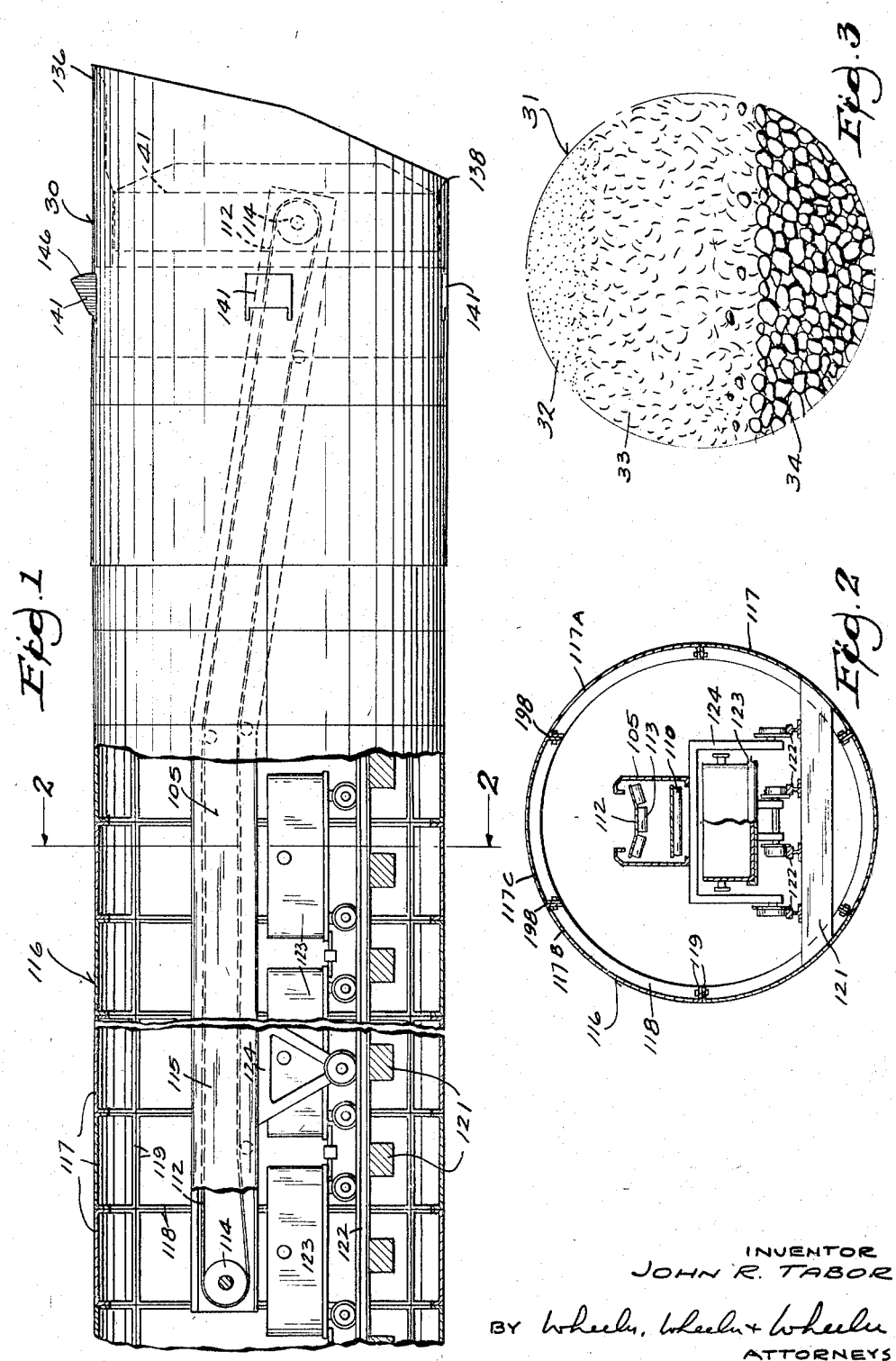
INVENTOR
JOHN R. TABOR
BY Wheeler, Wheeler & Wheeler
ATTORNEYS May 7, 1968  J. R. TABOR  3,382,002
ROTARY CUTTER WHEEL TUNNELING MACHINE
Filed July 23, 1965  8 Sheets-Sheet 2
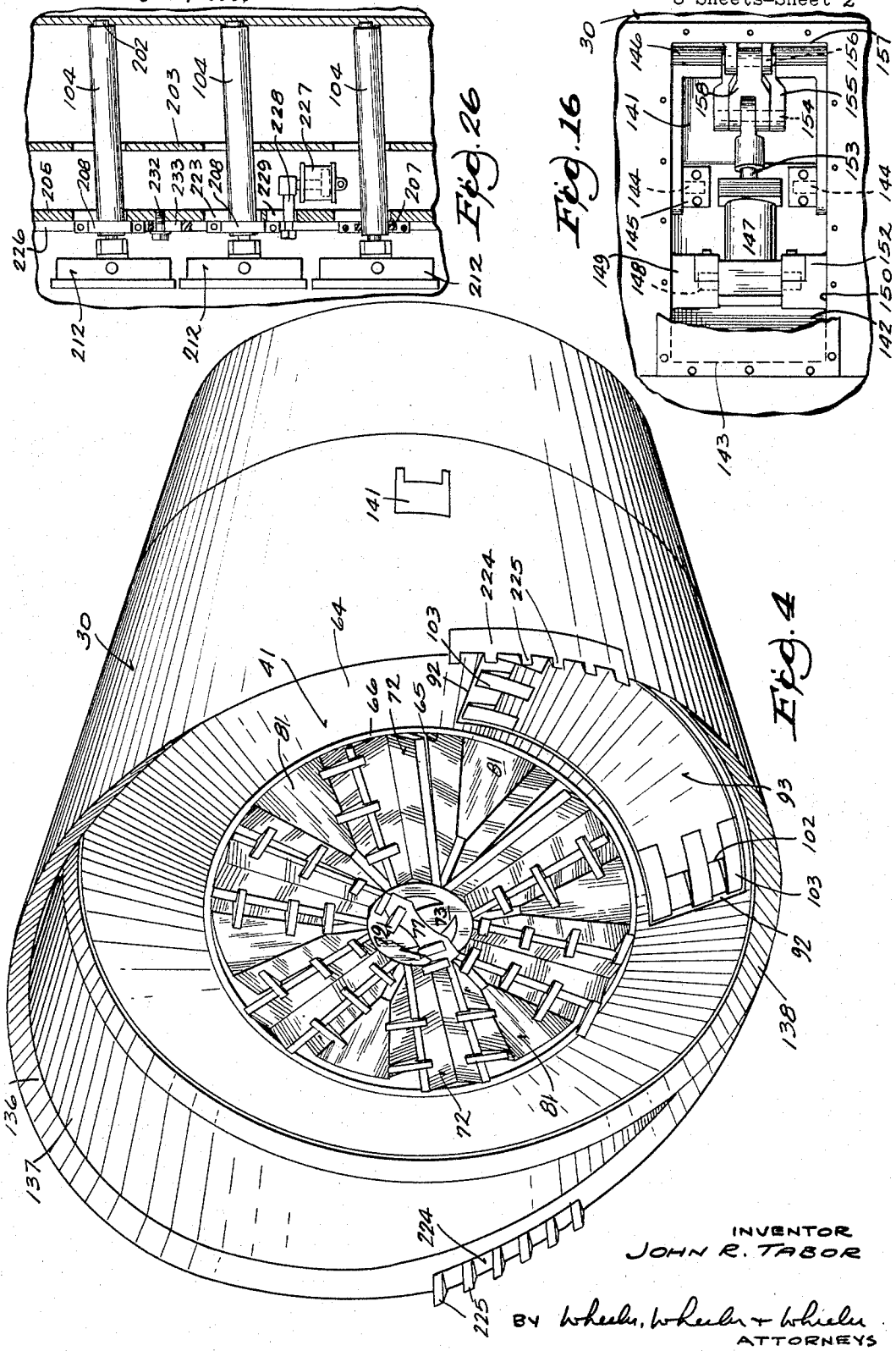
INVENTOR
JOHN R. TABOR
BY Wheeler, Wheeler + Wheeler
ATTORNEYS

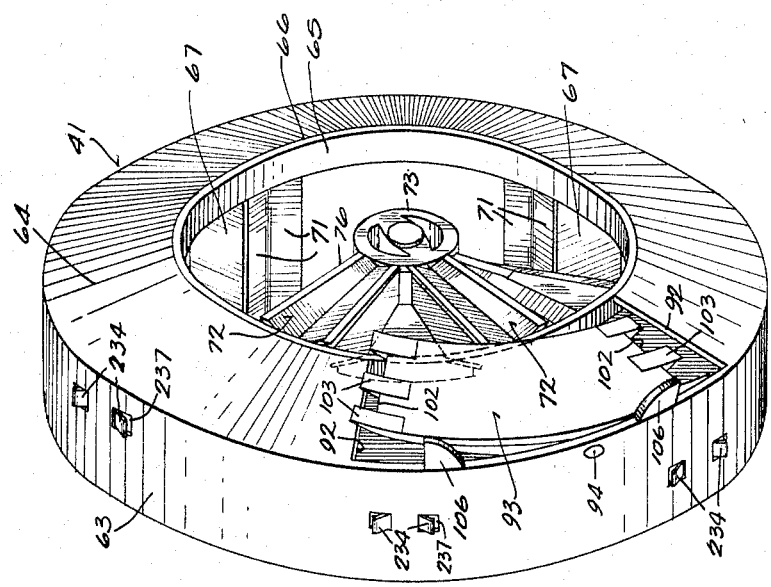
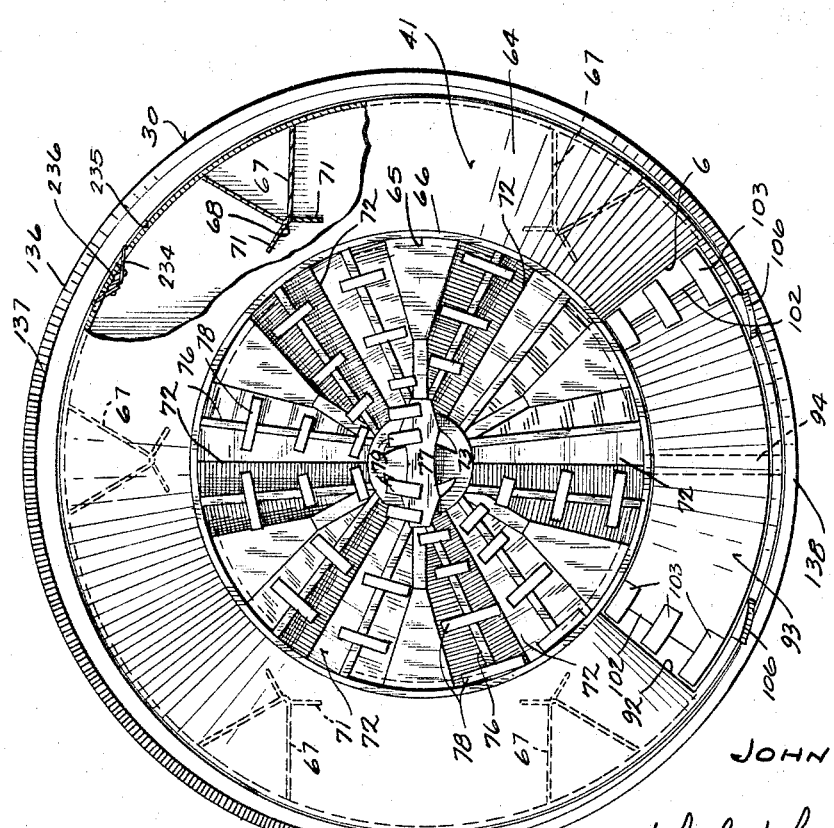

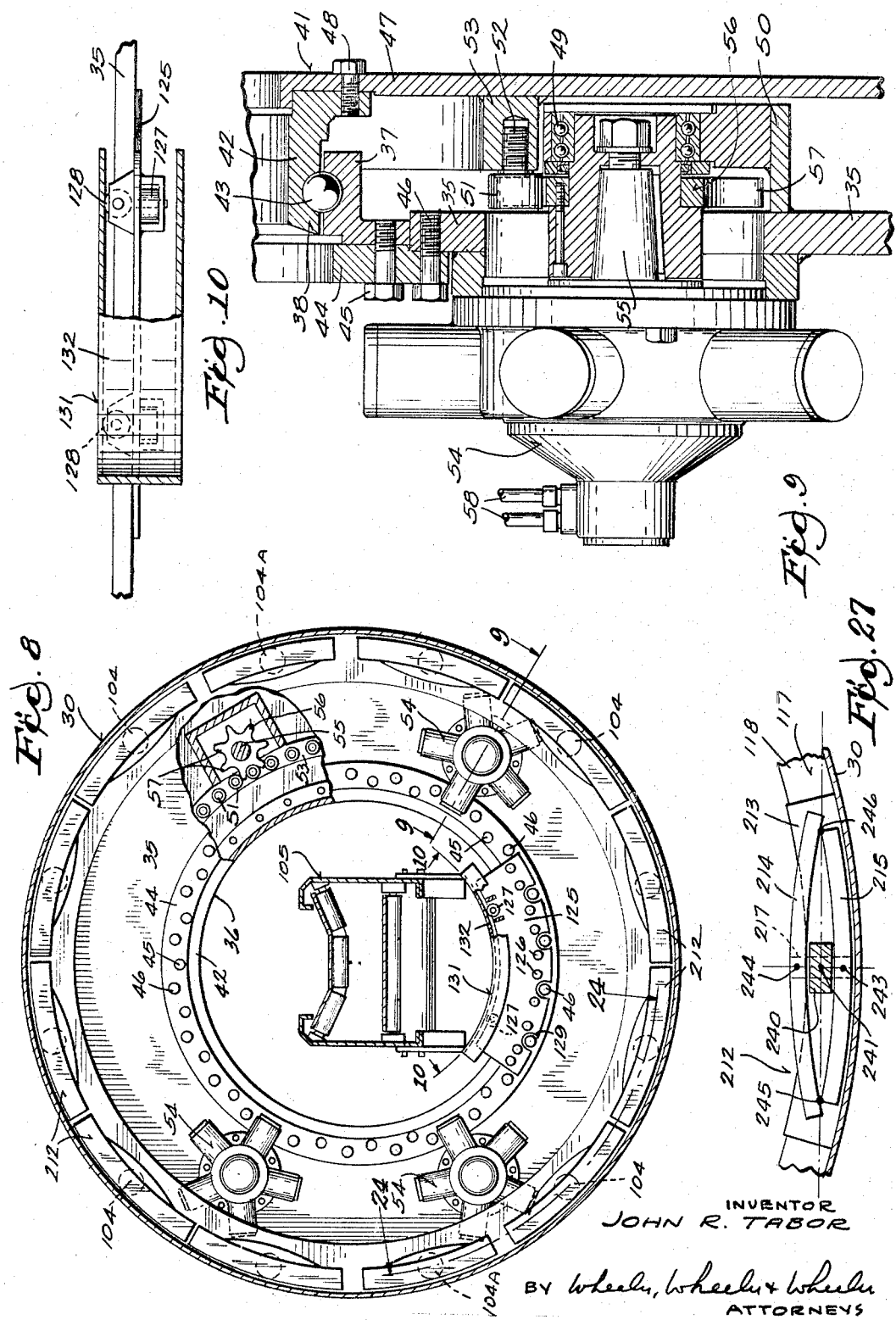

May 7, 1968  J. R. TABOR  3,382,002
ROTARY CUTTER WHEEL TUNNELING MACHINE
Filed July 23, 1965  8 Sheets-Sheet 6
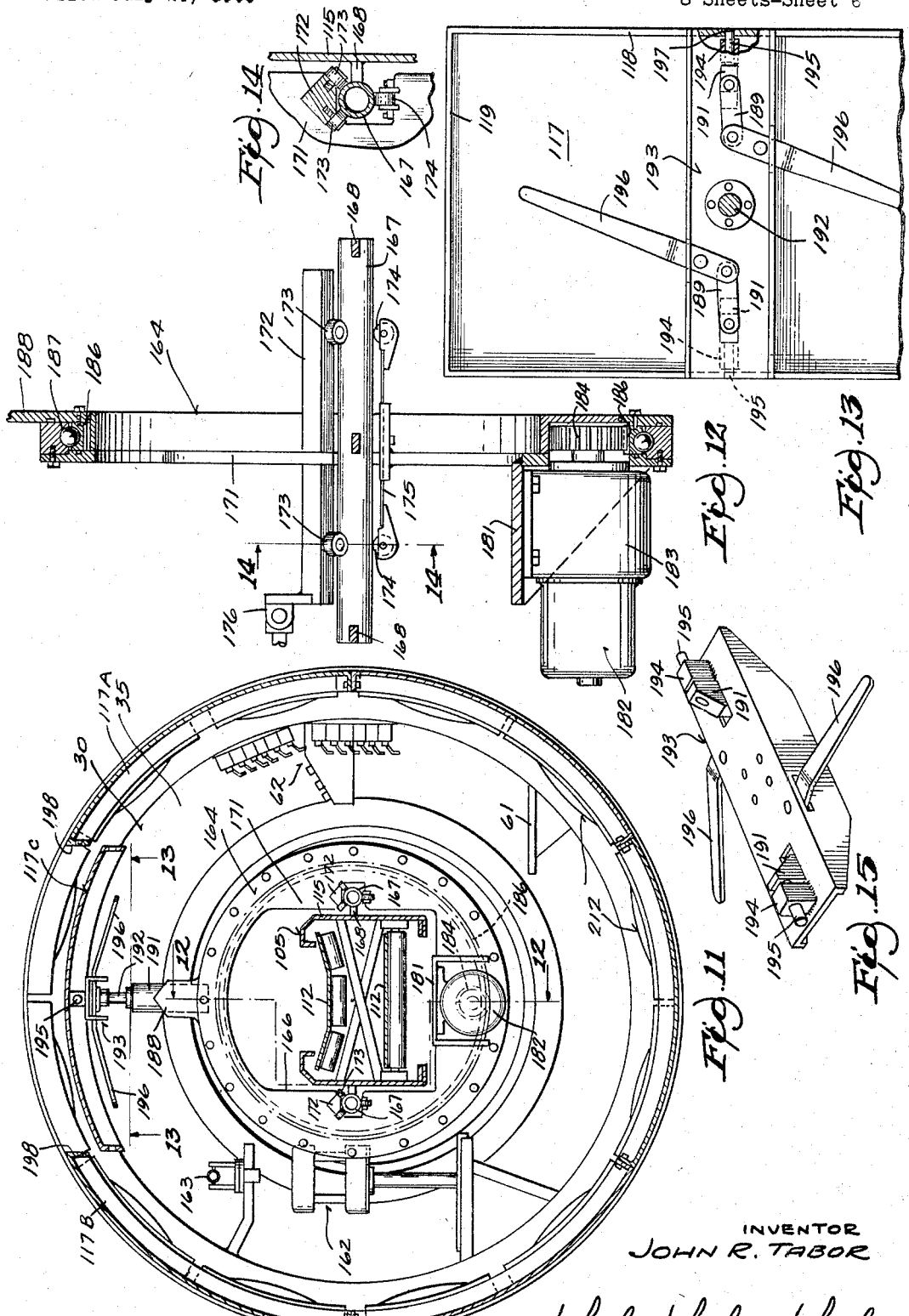
INVENTOR
JOHN R. TABOR
BY Wheeler, Wheeler & Wheeler
ATTORNEYS

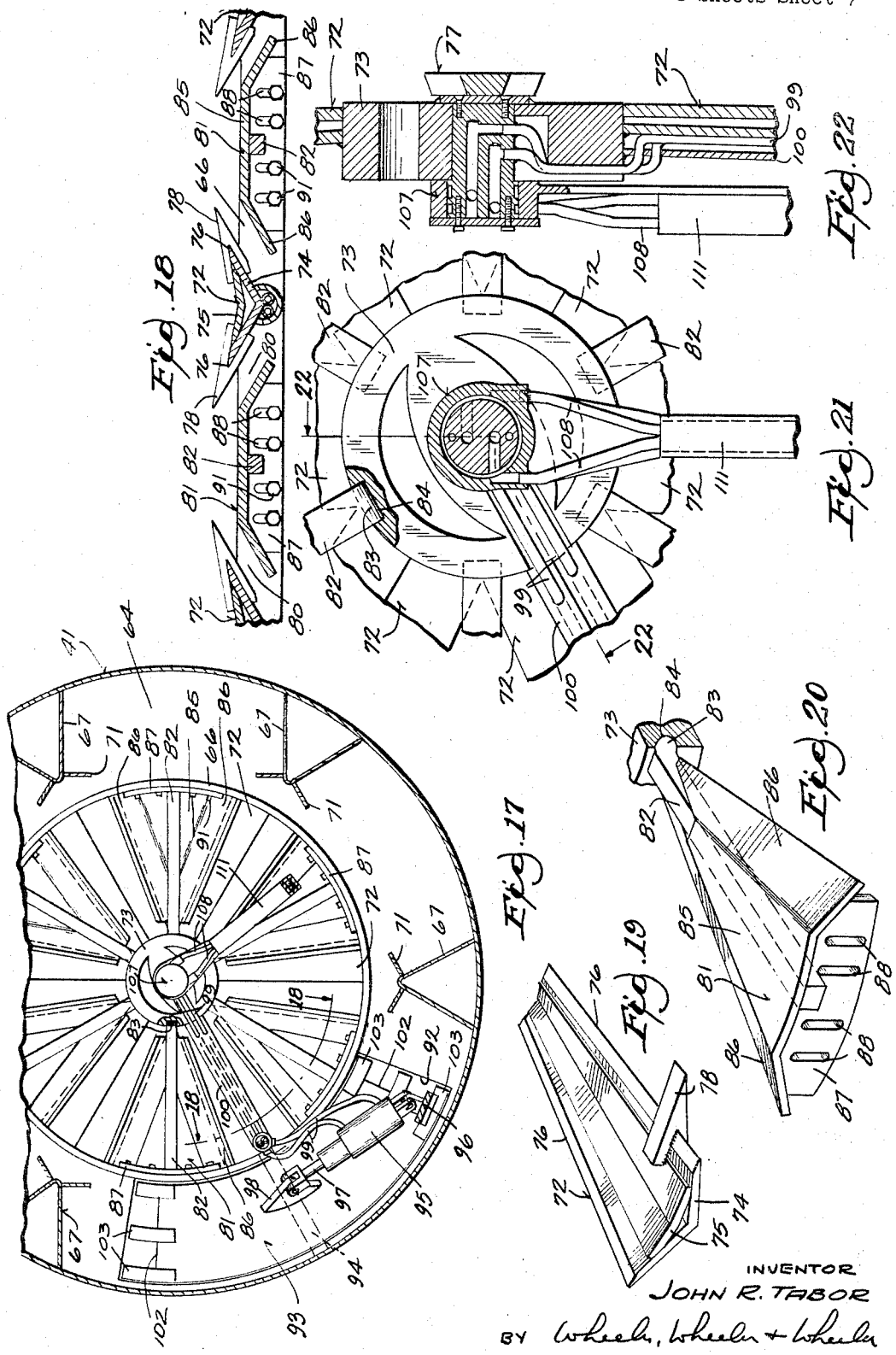

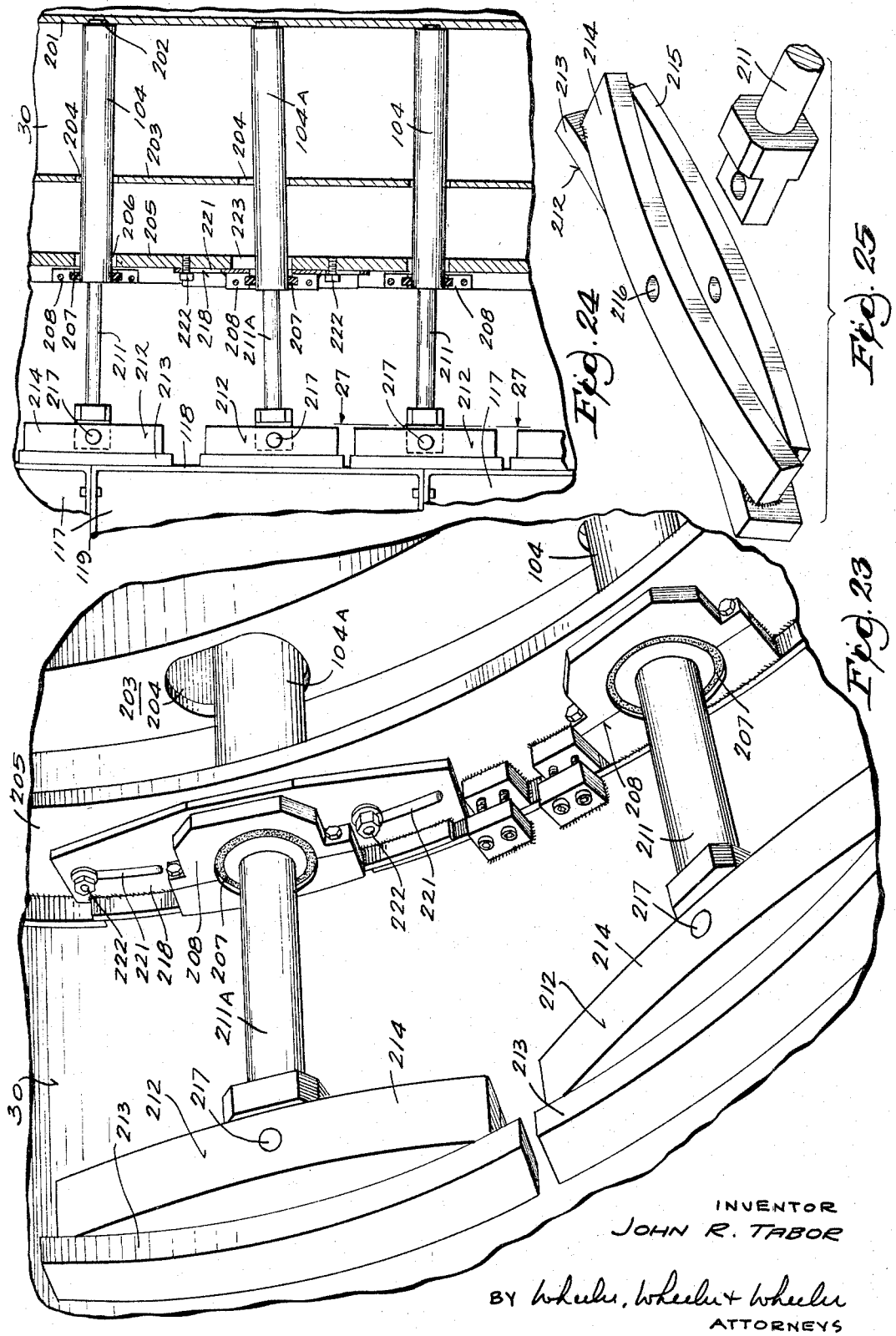

United States Patent Office 3,382,002
Patented May 7, 1968

3,382,002
ROTARY CUTTER WHEEL TUNNELING MACHINE
John R. Tabor, 3400 Spruce St., Racine, Wis. 53403
Filed July 23, 1965, Ser. No. 474,351
23 Claims. (Cl. 299—33)

ABSTRACT OF THE DISCLOSURE

This disclosure relates to a tunneling machine comprising a shield within which is mounted a rotary cutter wheel having a central, generally open zone with blades having cutting edges which face respectively in opposite directions of wheel rotation. Gates are provided to control the flow of spoil directly into the wheel through this central opening. The wheel is also provided with a marginal, generally closed annular rim portion which blocks flow of spoil directly into the wheel through the marginal zone but which has an opening in which an extendible claw is pivotally mounted. The wheel is mounted on an annular bulkhead and has an open center through which the input end of a spoil conveyor projects to receive spoil cut by the wheel.

---

This invention relates to a rotary cutter wheel tunneling machine.

The rotary cutter tunneling machine of the present invention incorporates important structural features which enable the tunneling machine to efficiently excavate and remove spoil from the tunnel face through earth strata formations previously unassailable by prior art rotary cutter wheel tunneling machines. The tunneling machine of the present invention is specifically designed to excavate through earth strata formations offering particularly troublesome excavating problems. The advantageous features incorporated in the machine of the present invention, moreover, give it versatility in operation, control and excavating efficiency which will vastly increase its excavating capacity in other less troublesome earth formations. Accordingly, the tunneling machine hereof has features of general application wholly apart from its specific design aforesaid.

A particularly aggravating tunnel face earth formation is one in which there are various layers or strata of different ground materials directly in the path of the excavator. These earth strata may be characterized as variegated or heterogeneous. Ordinarily, a rotating cutting wheel type of excavator is ill-suited for excavating in this type of earth formation, because the rotating cutting wheel is designed only to handle one type of ground material. For example, such a heterogoneous earth strata may consist near the top of the tunnel face of an earth stratum of loam, near the center of the tunnel face of an earth stratum of clay, and near the bottom of the tunnel face of an earth stratum of gravel.

A cutting wheel designed to operate in clay will likely hang up on the gravel, particularly if there are rocks or boulders of any size therein. The loam and clay will likely have different fluidity and will not flow at the same rate. To match this heterogeneous earth strata, the cutting wheel of the tunneling machine of the present invention is specifically designed with different zones or areas across the face of the wheel, each having a different excavating action on the different earth stratum which it confronts.

In the case of the cutting wheel zone which confronts the gravel stratum, the wheel is provided with a power operated claw or bucket which can be worked in and out and from side to side for the purpose of manipulating any particularly large boulder or rock in the gravel stratum, thus to loosen such boulder and facilitating its excavating by the cutting wheel.

Another advantageous feature of the cutting wheel of the present invention is its construction in which its excavating blades have edges faced both in the clockwise and counterclockwise direction of wheel rotation. Accordingly, the wheel can be reversed in its direction of rotation to improve its angle of attack upon the tunnel face. Moreover, by periodically reversing the direction of wheel rotation, the tendency of the shield to roll about it axis can be counteracted to maintain the shield upright.

Another advantageous feature of the cutting wheel of the present invention is the specific configuration of the cutting blades at the center zone of the wheel. These fan out from the center of the wheel toward its margin. These blades coact with gates interdigited between adjacent blades. The gates at least partially close the spaces between the fan blades, thus to adjust the size of the openings through the wheel and control the rate of flow of spoil through the cutting wheel. In preferred embodiments of the invention, the gates and blades are disposed in imbricated relationship. The adjustment aforesaid is achieved by varying the axial spacing between the imbricated gates and blades.

Another advantage of the cutting wheel of the present invention resides in its construction in which it has an open central portion into which the forward end of a spoil conveyor extends. In this connection, the shield is provided with an annular diaphragm or bulkhead having an open center, the center rim of which provides a bearing for the cutting wheel. The spoil conveyor extends axially through the shield and through the open center of the bulkhead and the wheel into spoil receiving relationship with lift flights on the wheel.

The shield of the present invention is further provided with steering brake shoes distributed about its periphery and which may be variably projected radially therefrom, thus to offer a variable resistance at one side or another of the shield to its forward advance through the earth. Accordingly, by variably projecting one shoe or the other, the shield can be steered in the desired direction through the earth. Any tendency of the shield to wander from its intended path of forward advance can be corrected. In preferred embodiments of the invention, these brake shoes are spaced axially from the bulkhead upon which the cutting wheel is mounted and are recessed in pockets accessible through access plates from within the shield.

The shield of the present invention is pushed forwardly in the earth by a series of thrust motors, such as hydraulic jacks. It is an important feature of the present invention that at least some of these jacks have mountings capable of skewed adjustment, by which the skew jacks may induce a rotational thrust upon the shield as well as an axial thrust. Accordingly, the skew jacks are used to correct unwanted roll in the shield. Such roll typically results from shield reaction to the rotating cutting wheel.

Another feature of the tunneling machine of the present invention consists of the roller support of the longitudinally extending spoil conveyor and on which the conveyor may adjust with respect to the shield to remain in a horizontal position, regardless of any roll induced in the shield as aforestated.

Another feature of the tunneling machine of the present invention is provision for a casing section erector ring which is desirably mounted on the longitudinal spoil conveyor and which rotates thereabout. The ring has a sweep arm to lift tunnel casing wall sections into place. The erector ring is desirably mounted on tracks attached to the spoil conveyor and has power means by which it may be advanced and retracted longitudinally of the shield on said tracks.

A further feature of the present invention resides in the jack shoes mounted on the ends of the pushing jacks. These shoes have curved thrust pads which conform to the curvature of the ribs or flanges on the tunnel casing.

The shoes are pivotally connected to the jack shoes to accommodate for shield roll. The construction is such that jack pressure is exerted as close to the casing wall as possible, thus to avoid imposition of undue bending stresses on the casing wall flanges or ribs.

Other objects, features, and advantages of the invention will appear from the following disclosure in which:

FIG. 1 is an extended side elevation of a tunneling machine embodying the present invention, at the head end of a tunnel, part of which is shown in vertical cross section.

FIG. 2 is a transverse cross section taken along the line 2—2 of FIG. 1.

FIG. 3 is a transverse cross section taken through the tunnel face and diagrammatically illustrating the heterogeneous earth strata through which the machine is specifically designed to excavate.

FIG. 4 is an enlarged perspective view from the head end of a machine embodying the present invention.

FIG. 6 is a front elevation of a tunneling machine embodying the present invention, portions being broken away to show details of the spoil lifting flights of the cutting wheel.

FIG. 7 is a perspective view of the cutting wheel removed from the shield, some of the excavating blades and plates being omitted to expose the spoil lifting flights.

FIG. 8 is a cross section taken along the line 8—8 of FIG. 5.

FIG. 9 is a fragmentary cross section taken along the line 9—9 of FIG. 8.

FIG. 10 is a fragmentary arcuate across section taken along the line 10—10 of FIG. 8.

FIG. 11 is a transverse cross section taken along the line 11—11 of FIG. 5.

FIG. 12 is a fragmentary cross section taken along the line 12—12 of FIG. 11.

FIG. 13 is a fragmentary cross section taken along the line 13—13 of FIG. 11.

FIG. 14 is a fragmentary cross section taken along the line 14—14 of FIG. 12.

FIG. 15 is a perspective view showing the casing section clamp at the end of the sweep arm of the erector ring.

FIG. 16 is a fragmentary view taken along the line 16—16 of FIG. 5.

FIG. 17 is a partial elevation of the inside of the cutting wheel, this view being taken substantially along the line 17—17 of FIG. 5.

FIG. 18 is a fragmentary arcuate cross section taken along the line 18—18 of FIG. 17.

FIG. 19 is a fragmentary perspective view of one of the double-edged fan blades of the cutting wheel.

FIG. 20 is a perspective view of one of the baffle plates of the cutting wheel, a fragment of the cutting wheel hub being also shown in this view.

FIG. 21 is an enlarged detail view of the center hub portion of the cutting wheel and showing the rotatable fluid line coupling providing fluid pressure to the hydraulic motor for the cutting wheel claw.

FIG. 22 is a fragmentary cross section along the broken line 22—22 of FIG. 21.

FIG. 23 is a fragmentary perspective view from the inside of the shield and showing details of the mounting of the pushing jacks and particularly the adjustable mounting of one of the skew jacks.

FIG. 24 is a fragmentary arcuate cross section taken along the line 24—24 of FIG. 8.

FIG. 25 is an enlarged perspective view showing in spaced apart relation a pushing jack piston rod and a pushing jack shoe.

FIG. 26 is a view similar to FIG. 24 and showing a modified arrangement to skew the pushing jacks.

FIG. 27 is a fragmentary cross section taken along the line 27—27 of FIG. 24.

Figure 5:
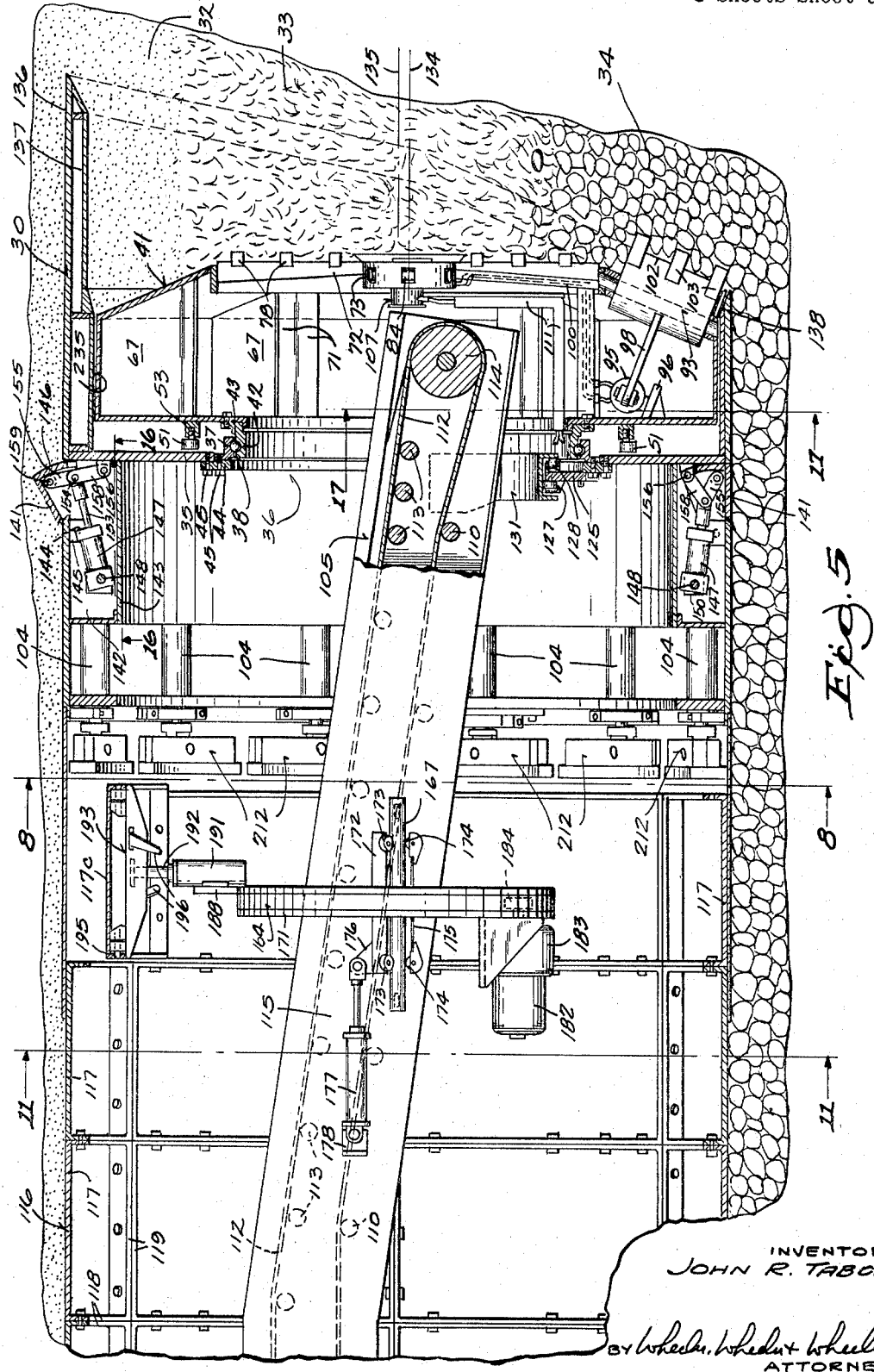
FIG. 5 is an enlarged axial cross section taken through a tunnel, a tunneling machine embodying the present invention, and the earth formation through which the machine is tunneling.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The shield 30 is typically cylindrical and works on a tunnel face 31 which, as shown in FIGS. 3 and 5, may consist of a variegated or heterogeneous ground strata. In a particularly aggravated earth formation, to which reference has heretofore been made, the upper portion of the face 31 consists of loam stratum 32, the middle portion of the face consists of a clay stratum 33, and the bottom portion of the face consists of a gravel stratum 34.

The shield 30 is provided near its head end with an annular bulkhead 35 (FIGS. 5, 8 and 9), which has a large internal opening 36 on which is mounted the outer race 37 of a circular anti-friction bearing 38 which supports the cutting wheel 41. Bearing 38 also has an inner race 42 attached to the cutting wheel 41. Races 37, 42 provide a radial and axial thrust bearing cage for a single circular series of balls 43. As only one series of balls is used, I characterize this bearing as a mono-race bearing.

The outer race 37 of bearing 38 is detachably connected to the bulkhead 35 by a mounting ring 44 detachably fastened to the race 37 by an annular series of bolts 45. Ring 44 is detachably connected to the inner periphery of the annular bulkhead 35 by a series of bolts 46.

The inner race 42 is detachably connected by an annular series of bolts 48 to an annular support plate or diaphragm 47 of the cutting wheel 41. Race 42 and ring 44 respectively fit against the rear faces of wheel diaphragm 47 and bulkhead 35. Accordingly, removal of bolts 45 and 48, and motors 54, permit axial withdrawal of the bearing rearwardly into the shield for repair and replacement. During this procedure the wheel may remain in position, and it is unnecessary to remove the wheel to repair its bearing.

As best shown in FIGS. 8 and 9, the annular cutting wheel plate 47 is provided with a circular series of roller pegs 51. These are detachably connected by threaded axle studs 52 to a ring-shaped mounting rib or drive ring 53 welded to one side of the mounting plate 47 for the wheel 41. Drive ring 53 is concentric with bearing races 37, 42 and has a larger diameter to be radially offset from the bearing toward the shield wall. The motors 54 are correspondingly offset from the open center of the wheel and bulkhead toward the shield wall.

The wheel 41 is powered in its rotation on bearing 38 by a series of hydraulic motors 54 which are clustered circumferentially around annular bulkhead or diaphragm 35. Each hydraulic motor 54 has a drive shaft 55 keyed to a sprocket 56, the teeth 57 of which engage the roller pegs 51, as shown in FIGS. 8 and 9. Sprocket 56 is mounted on bearings 49 in a housing 50 welded to the bulkhead 35.

The several hydraulic motors 54, four of which are disclosed herein for exemplification, are powered hydraulically through the hydraulic pressure lines 58. The motors 54, per se, are conventional. These motors are reversible so that they may drive the cutting wheel 41 either clockwise or counter-clockwise. Torque is applied to the wheel at several points around its circumference. Accordingly, great turning force can be imposed upon the wheel, all of the motors 54 being coordinated under control of the operator at the operator station 61 and electric switch and hydraulic valve control console 62 shown in FIG. 11.

Excavating through the heterogeneous strata shown in FIG. 3 will produce differential resistance to excavating across the face of the cutting wheel. The gravel stratum 34 will offer a different degree and kind of resistance than the clay stratum 33 and the loam stratum 32. There will be differential degrees and kinds of resistance as between the clay stratum 33 and loam stratum 34. As a general proposition, the bottom of the shield will encounter more resistance than the top. Accordingly, there will be a tendency for the shield to dip at its head end. Structure embodied in the device of the present invention to overcome this tendency to dip is illustrated in FIG. 5, in which the centerline 134 of the cutting wheel is eccentric to the centerline 135 of the shield, thus to offset the cutting wheel 41 closer to the bottom of the shield than to its top. This tends to produce more earth working activity at the bottom than at the top and will thus tend to overcome the dipping of the shield.

Moreover, by reason of the offset aforesaid, the front part of the shield at its top, comprising an overhanging hood or visor 136, is made thicker, as shown at 137, than at its bottom. The bottom forward edge 138 of the shield is correspondingly thin so it will offer little resistance to forward movement of the shield. The thickened top or hood edge of the shield will have to produce more earth cleavage to advance. The energy absorbed in producing this greater cleavage will further resist movement of the shield at its top edge, to lessen the tendency for the shield to dip.

The cutting wheel 41 is specially fabricated to have diverse excavating instrumentalities across its face. The wheel is relatively deep axially to comprise a drum with spoil lifting flights therewithin. Mounted at right angles to the annular support plate 47 is an outer casing 63 at the forward edge of which there is a frusto-conical skirt 64 forming a relatively wide flared margin at the front face of the wheel and which has a large center opening 65 bounded by a reinforcing rim or ring 66. The skirt 64 and ring 66 are further supported from the plate 47 by the axially extending bridging and spoil lifting struts 67. Struts 67 have hollow interiors and are angular in cross section with their apices 68 directed toward the center of the wheel. Each apex of each strut 67 is provided with spoil lifting flanges 71. The struts 67 and flanges 71 together comprise spoil lifting flights to carry spoil to the top of the drum and drop it onto the spoil conveyor 105.

The front face of the wheel 41 in its central zone defined by opening 65 as bounded by the rim 66 is provided with a series of radial cutting blades 72 which fan out from a center hub 73 and are welded endwise to rim 66. Details of this construction are best shown in FIGS. 6, 7 and 17–22. Each blade 72 is fabricated to have a sturdy hollow triangular cross section by welding a series of plates 74, 75 together, as shown in FIG. 19. The edges of plates 74 are sharpened at 76. Teeth 78 are desirably welded to the blades 72. In the disclosed embodiment there are six double-edged fan blades 72 radiating from the hub 73 to the rim 66. These are welded rigidly at their respective ends to the rim 66 and hub 73 to provide a central support for the hub 73 and a firm and solid base for the cutting edges 76 of the blade 72. Hub 73 may also carry a plate 77 to which teeth 79 are attached (FIGS. 4 and 6).

The spaces between the blades or spokes 72 are at least partially filled by a series of annularly spaced baffles or gates 81. Each gate 81 consists of a core strut 82 having a rounded bearing knob 83 which is seated for limited pivotal movement in a corresponding socket 84 in the hub 73. To the center strut 82 is fastened a triangularly shaped filler plate or gusset 85 having outwardly flared or angled wings 86. The out end of the gate 81 has an end wall 87 which is provided with a series of slots 88 by which the gate 81 is movably fastened by bolts 91 to the rim 66. As best shown in FIG. 18, each gate or baffle 81 is free for limited movement in the direction of the elongation of slots 88 about the pivotal bearing of its strut knob 83 in the socket 84 in hub 73.

This affords adjustment in the gaps 80 through the wheel face by the increase or decrease of the spacing between the gate 81 and the fan blades 72.

From the foregoing it is clear that the respective fan blades 72 and gates 81 are interdigited so that the flow of spoil cut from the tunnel face 31 by the blades 72 can be controlled. Moreover, because the wings 86 of the gates 81 obliquely overlap the edge margins of the blades 72 in imbricated relationship, the movement of the gates 81 in the direction of elongation of the slots 88 (axially of the wheel) will correspondingly narrow or widen the gap 80 between the gates and blades, thus to adjust the cutting wheel for various soil conditions at the tunnel face.

If a relatively loose, mucky and easily flowable stratum is encountered, the gap 80 will be narrowed to offer more resistance to flow of the spoil through the wheel. If a less flowable stratum is encountered, the gap 80 will be widened to facilitate flow of the spoil through the wheel. Spoil entering the drum enclosure of the wheel will be picked up by flights 67, 71 to be deposited on the spoil conveyor 105.

The marginal rim portion of the wheel 41, consisting of the frusto-conical skirt 64 is substantially unbroken except for a large opening 92 in which a claw 93 is mounted. Claw 93 resembles a trap door which is curved complementary to the skirt 64 to fit within the opening and substantially close it in its position shown in FIGS. 4 and 6.

In this condition, the skirt 64 is well adapted to function as a breasting support for the tunnel face. The face of claw 93, when closed, or open for a small extent, will act as a breasting support for spoil confronting it. The relative extent to which the claw breasts or cuts can be varied by the extent of its projection ahead of skirt 64.

As best shown in FIGS. 5 and 17, claw 93 is pivotally mounted on a shaft 94 which spans across the opening 92. It may be swung about said shaft 94 by the hydraulic motor ram 95 which is mounted on one side of the annular wheel bracket plate 47 on a shelf 96. The extendible piston rod 97 of the ram cylinder 95 is pivotally connected to crank 98 which is welded to the backside of the claw 93. Hydraulic fluid pressure applied to the jack cylinder through the lines 99, as controlled from console 62, will swing the claw about the pivot shaft 94 in either direction to selectively project either one of its two edges 102 outwardly away from the skirt 64, as shown in FIGS. 5 and 7. The edges 102 are desirably provided with cutting teeth 103. With the door or claw 93 partly open, and the wheel rotating in a direction to engage the extending edge 102 and teeth 103 of the claw 93 with the earth strata, the material engaged by the claw will be scooped into the cutting wheel to be picked up by the flights 67, 71 for deposit on spoil conveyor 105.

The claw 93 is particularly suited for excavating the gravel stratum 34, shown in FIGS. 3 and 5, because of the wide opening that can be produced in the wheel margin or skirt 64 by opening the claw. It has a range of opening up to twenty-two inches clearance between edge 102 and the skirt 64. Accordingly, even relatively large rocks or boulders can be admitted through the opening 92. In one sense, the claw 93 functions in the manner of an excavator shovel or bucket. Where a large stone or boulder is encountered which is difficult to dislodge, the door or claw 93 can be worked in and out of its opening 92 under power of the hydraulic jack 95, thus to loosen the rock or boulder preparatory to bringing it in through the opening 92. Counter rotation of the wheel is also effective for the purpose. The claw 93 is desirably guided in its pivotal movement about the pintle 94 on the guide lugs or plates 106. Ordinarily, however, the door or claw 93 would have only a three to five inch projection from the face of the apron 64. This is ample to excavate gravel stratum such as shown at 34 in FIGS. 3 and 5.

In operation, the cutting wheel 41 is ordinarily turned only when the shield 30 is under forward pressure produced by the pushing jacks 104, as hereinafter explained. During this time period, the wheel 41 is constantly rotated either clockwise or counterclockwise. Accordingly, spoil cut from the center portion of the tunnel face 31 will continuously be cut by the blades 72 and fall into the inside of the wheel. Concurrently with flow of spoil through the center portion 65 of wheel 41, spoil from the annular margins of the tunnel face will flow into the wheel through the claw opening 92. Inasmuch as a large peripheral portion of the skirt 64 of the wheel is closed, spoil will flow through the opening 92 only from that part of the tunnel face opposite said opening. Meanwhile, the pressure of the jacks 104 will force the skirt 64 axially against the face to extrude spoil at the face margin toward its center and through the center opening 65.

In the disclosed embodiment, the central portion 65 of the wheel is somewhat ahead of the skirt 64 which flares rearwardly therefrom. Accordingly, except for spoil brought in by the extended claw 93, the center part of the tunnel face will be excavated first. In one sense this "undercuts" marginal spoil. Such spoil will easily be extruded under forward pressure of the cutting wheel to flow through the opening 65. The marginal spoil at the top of the face will be assisted by gravity in this movement.

If desired, the operator may open the claw 93 only when it traverses the bottom arc of its rotation to admit the gravel from stratum 34 into the wheel. He may close the door or claw 93 when it traverses the upper arc of its sector of rotation, thus to avoid excessive loam admittance into the wheel and to maintain back pressure on the top half of the shield.

The hydraulic lines 99 for the claw actuating cylinder 95 are protected, as shown in FIGS. 5, 17, 18, 21 by passing them through a protective conduit 100. Near the inner end of the blade 72 the lines 99 are connected to a rotating fluid coupler 107 which provides a liquid tight rotary connection to a corresponding pair of fluid lines 108 which lead from the rotating coupler 107 to a protective conduit 111 by which the fluid lines 108 are carried through the bulkhead opening 36, and thence to the console 62 at the operating station 61, as shown in FIG. 11.

The cutter wheel drive motors 54 have a variable speed drive to give the operator fine control over the speed of rotation of the wheel 41. A typical speed of rotation is 8 r.p.m., although this may be increased or decreased as conditions warrant. In dislodging a boulder with the claw 93 extended, the operator can alternately rotate the wheel 41 in one direction and then in the other, in the course of loosening the boulder.

As best shown in FIGS. 4 and 6, the teeth 78 are desirably omitted from the proximate edges 76 of the blades 72 which bound one of the gates 81 near the claw opening 92. This leaves room for a workman to crawl through the gap between these blades (when the intervening gate is removed) in the event it is desirable for the workman to have access to any boulder or any other object which the claw 93 is unable to dislodge. Typically, it will be specially treated, as by disintegrating it with explosives.

As before indicated, an important feature of the present invention is the cutting wheel construction in which it has an open drum-like center, thus to deposit spoil on the intake end of the longitudinal spoil conveyor 105. As best shown in FIGS. 1, 2, 5, 8 and 11, spoil conveyor 105 desirably consists of an endless belt 112 which is supported on rollers 110, 113 and end rolls 114, as is conventional. A housing 115 encloses the belt conveyor 105 except at its top. The spoil conveyor 105 extends rearward through the shield 30 and into the tunnel casing 116 which is built in segments in the shield and which is exposed gradually as the shield is pushed forwardly by its pushing jacks 104.

The casing 116 is conventional. It may consist of a series of axially spaced circular ribs with wooden lagging extending therebetween, as shown in my copending United States patent application Ser. No. 374,004. In this application, I illustrate a somewhat different form of conventional casing which consists of prefabricated steel plate sections 117. These are also conventional in the tunneling art. Each plate 117 is provided with integrally fabricated side edge flanges 118 and transverse edge flanges 119 which are bolted or riveted or otherwise fastened together to create a tight steel sheath or casing around the tunnel as the shield is pushed forwardly thereof. Details of the pushing mechanism and the erection of the casing plate sections 117 will be hereinafter described.

As shown in FIGS. 1 and 2, the casing 116 is typically provided with a floor consisting of a series of wooden cross ties 121 which serve as supports for the rails or tracks 122 upon which mine cars 123 travel along the tunnel to transport equipment and material into the tunnel and to remove spoil therefrom. Spoil conveyor 105 is mounted at its tail end upon gantry 124 which has wheels rollably supported on the outside set of tracks 122. The mine cars 123 are of such a size as to easily travel on the inside set of rails 122 beneath the gantry 124. Accordingly, two or three of the mine cars 123 can be temporarily stored beneath the tail end of conveyor 105. As the shield 30 is pushed forwardly and spoil is conveyed rearwardly by the conveyor 105, it will be deposited in the mine cars 123 which will successively be drawn rearwardly of the tunnel by an electric locomotive or "dinky" and then removed from the tunnel.

The over-all capacity of the series of mine cars 123 stored beneath the conveyor 105 is calculated to substantially equal the quantity of spoil which is removed from the face during one shove forwardly of the shield jacks 104. This typically amounts to about one meter. While the mine cars are being removed, another annular series of plates 117 will be erected within the tail end of the shield 30 and attached to the preceding segment of the casing. This adds another segment of casing wall. By the time this has been accomplished, another set of empty mine cars will have been returned to storage beneath the conveyor 105 pending the next shove forwardly on the shield.

The forward end of the conveyor 105 is supported on the bulkhead 35, as best shown in FIGS. 5, 8 and 10. A curved roller support plate 125 is attached to the lower part of the bulkhead 35 by bolts 126 or the like. The bottom edge of plate 125 is notched out at 129 to clear the heads of bolts 45. At its upper edge, the plate 125 is provided with radial thrust load bearing rollers 127 and with axial thrust load bearing rollers 128. The head end of conveyor 105 is provided with a downwardly open channel 131, the web 132 of which rests on the radial thrust bearings 127 and the flange 133 of which bears on the axial thrust rollers 128. Accordingly, the spoil conveyor 105 is supported on the bulkhead 35, but has a rotatable connection therewith. This is to permit the shield to roll slightly on its axis without transmitting rolling motion to the conveyor 105. Accordingly, the conveyor 105 will remain perfectly horizontal and level, as determined by its gantry support. As the shield moves forwardly under pressure of its jacks 104, the thrust rollers 128 will draw the conveyor 105 along with it, its tail end rolling on the wheels of the gantry 124.

The brake shoe steering feature of the invention is best illustrated in FIGS. 1, 4, 5 and 16. A series of retractable steering brake shoes 141 are spaced around the periphery of the shield. In the disclosed embodiment, four such steering shoes are illustrated. The steering shoes 141 are housed within pockets 142 in the shield. The pockets 142 are desirably disposed just rearwardly of the annular bulkhead 35. Each pocket is covered by removable access plate 143 which can be removed to facilitate repair or replacement of the shoes 141 and their accessory power equipment.

Each steering or brake shoe 141 is pivotally connected by axially aligned stub pintles 144 in bearing blocks 145 welded to the inner surface of the shield 30. Each shoe 141 has a curved side conforming to the configuration of the shield side wall and has a snub nose front wall 146. The brake shoes are projected from retracted to extended position by hydraulic motor rams 147 which are pivotally connected on stub pintles 148 to bearing blocks 149 which are welded to the side walls 150 of the pockets 142. Blocks 149 may be provided with removable bearing segments 152 to facilitate disassembly of the stub axles 148 from the bearing block 149.

The hydraulic ram 147 has an extensible piston rod 153 connected to the knee pin 154 of paired toggle joint links 155, 158. One of the toggle joint links 158 is pivotally connected on pin 156 to end wall 157 of the pocket 142, and the other link 155 is pivotally connected on pin 159 to the shoe 141. Accordingly, pressure of the ram 147 tending to straighten the knee of the toggle joint will exert great outward force on the shoe 141 to project it to its position shown near the top of FIG. 5. When straightened, the toggle joint links will be locked.

Hydraulic pressure for the four hydraulic motor rams 147 is controlled at console 62 by the operator at station 61. If the shield tends to dip, the uppermost shoe may be projected partially or fully to add resistance to the forward advance of the top of the shield, thus tending to correct the dip. The shoes 141 are also useful in steering the shield to either maintain it on a straight course or to turn corners, etc. The direction of travel of the shield is accurately surveyed by a civil engineer seated at station 162, as shown in FIG. 11. The civil engineer may use the transit 163 to sight rearwardly down the tunnel and instruct the operator at station 61 with respect to the direction of travel of the shield, etc.

Casing section plates 117 are erected at the termination of each forward push of the shield to add an axial segment to the casing. This is facilitated by the erector ring 164, best shown in FIGS. 5 and 11–13. The ring 164 has a support bracket plate 171 with an open center at 166 to embrace the spoil conveyor 105. The spoil conveyor 105 desirably has tubular tracks 167 mounted outboard of its sides 115 and carried on brackets 168 (FIG. 14). The erector ring mounting plate 171 carries a wheel carriage 172 having paired obliquely related rollers or wheels 173 which ride on the top of the tubular tracks 167. The plate 171 also carries opposed wheels 174 which are spring biased against the bottom of track 167 on leaf spring arms 175.

At one end the carriage 171 is provided with a coupling 176 to which a hydraulic ram or motor 177 is connected, the other end of the motor 177 being pivotally connected on the bracket 178 to the side wall 115 of the conveyor 105. Hydraulic fluid is supplied to the motor cylinder 177 from console 62.

Bracket plate 171 carries at its lower end a platform 181 for the support of hydraulic motor 182 which is connected through speed reducer 183 to a drive pinion 184 meshing with a ring gear 186 fast to the erector ring 164, and by which the ring is rotated on the anti-friction bearing 187. One race of the bearing 187 is fast to the plate 171, and the other race is fast to and rotates with the erector ring 164.

Erector arm 188 extends radially from the ring 164 and carries on its end a hydraulic piston or ram 191, the extensible piston rod 192 of which carries a casing segment plate clamp jig 193. As best shown in FIGS. 15 and 16, clamp jig 193 has fixed bearing blocks 194 through which coupling stems 195 are guided. The stems 195 are actuated by lever handles 196 to selectively extend the stems 195 into engagement with suitable holes 197 provided in the side flanges 118 of the segment plates 117 for the purpose of erecting the plates as illustrated in FIGS. 5 and 11. Each lever 196 is connected by a link 189 to a guide block 191 on which the stem 195 is mounted.

The plates 117 are quite heavy and will ordinarily be stacked on the floor of the shield, when they are brought in by the mine cars 123. The operator at station 61 will operate the appropriate valve at console 62 to rotate the coupling jig 193 on the end of the arm 188 of erector ring 164 to the bottom part of the shield. Operating personnel will then engage the pins 195 of the jig 193 with one of the plates. The operator will then swing the plate around the axis of the tunnel to position it at the desired point. By energizing the hydraulic motor 191, the plate 117 will be pushed toward the wall of the shield to align it with previously emplaced plates, whereupon the workmen will bolt the section 117 to the preceding sections of the tunnel casing 116.

In a typical installation, it will require six plates 117 to make up a complete segment of the casing, as shown in FIGS. 2 and 11. For each segment, all of the plates except the top roof plate will have their flanges 119 radial, as illustrated in FIG. 2. However, the two laterally spaced roof plates 117A and 117B will be specially fabricated to have their uppermost cross flanges parallel, as indicated at 198, so that the last or topmost keystone plate 117C can be inserted by moving it radially, as illustrated in FIG. 5. When a complete segment of plates has been bolted together as before indicated, the shield is in readiness for its next shove forward.

FIGS. 23–25 illustrate the details of the shoving jacks 104. The shield 30 is provided with an annular rib 201 to which the forward end of each jack is coupled by a tongue in socket connection at 202. The shield has another rib 203 provided with a series of openings 204 through which the cylinders 104 pass in projecting rearwardly. The shield 30 is further provided with another rib 205 which also has a series of openings 206 through which the cylinders 104 project. The cylinders 104 are fastened on resilient seals 207 to the shield and to rib 205 by the clamping blocks 208. The jacks 104 have projecting piston rods 211 which have a pivotal connection on pins 217 to the shoes 212. These shoes 212 are specially fabricated to bear on the edge flanges 118 of the casing plate sections 117. Inasmuch as the flanges 118 are curved, and it is desirable that the shoes conform as closely as possible thereto, the thrust plates or pads 213 of shoes 212 are correspondingly curved. Oppositely bowed reinforcing plates 214, 215 are then welded in edge abutting relation to the curved thrust plate or pad 213, and aligned holes 216 are drilled in the edge mounted plates 214, 215 to receive a pintle 217 by which the shoes 212 are pivotally connected to the rods 211 of the pistons 104.

The shoes 121 transmit the force of the hydraulic rams 104 to the emplaced casing 116. As the pressure is increased in the rams 104, the shield 30 is shoved forwardly to advance through the earth as aforestated. By reason of the curved pad 213, the pressure of the jack 104 is imposed as near as possible to the outer periphery of the casing 116. This relieves bending stresses on the inwardly projecting flanges 118 thereof.

The apparatus aforedescribed is adapted in the disclosed structure to create roll in the shield to correct or counteract any roll to which the shield may be subject because of the reaction of the rotating cutting wheel 41. A pair of skew jacks at the opposite sides of the shield, designated 104A in FIGS. 23 and 24, have an adjustable mounting so that the jacks may be skewed so that their thrust has both an axial and a lateral component. For this purpose the block 208 on which the rear end of the skew jack cylinder 104A is mounted is provided with an adjustable bracket 218 having arcuate slots 221 by which the bracket 218 is clamped by the bolts 222 to the side of rib 205. Rib 205 is provided with a circumferentially enlarged opening 223. Accordingly, by sliding the plate 218 to adjust its slots 221 along the bolts 222, the skew angle of the ram 104A can be adjusted. The piston rod 211A of the jack 104A is connected to its shoe 213 in the same manner as hereinbefore described.

With the skew jacks 104A adjusted to correct for roll, one shove forward of the shield may induce a slight correction in roll which will vary in amount, depending upon the earth formation, resistance to rotation of the shield, etc. The rotation of the shield will be limited to the extent of the yieldability of the packing 207 about the tail ends of the cylinders 104. Assuming a forward shove on all pistons with the skew jacks 104A adjusted to produce roll, lateral pressure will be exerted on the packings 207 of all cylinders 104. These will compress somewhat as the shield rolls. The shoes 213 will not be able to move circumferentially during this forward movement, because they are clamped by friction against the casing. As soon as pressure is relaxed on the cylinders 104, the energy stored in the compressed packings 207 will shift or step the shoes circumferentially a distance equal to the roll correction produced in the shield.

As best shown in FIG. 4, the edges of the shield 30 are desirably provided with knife edged blade segments 224 having teeth 225.

FIG. 26 shows a modified arrangement for mounting all the pushing jacks 104 so that they can be uniformly skewed. In this embodiment the clamping blocks 208 of all jacks 104 are mounted on a slip ring 226 which is powered for slight circumferential movement by hydraulic motor ram 227. Ram 227 is coupled to the ring 226 on post 228 which extends through a slot 229 in rib 205. Ring 226 is guided by the heads of bolts 232 which are anchored on rib 205 and extend through slots 233 in slip ring 226. Circumferential adjustment of ring 226 within the range of slots 233 will skew all jacks 104 uniformly.

As best shown in FIGS. 6 and 7, the drum wall 63 of wheel 41 is provided with a series of helically arranged scraper blades 234 which scrape against the concentric wall 235 of the shield, thus to remove any spoil which may be forced into and collect between walls 63 and 235. The blades 234 are mounted in oppositely extending pairs inside wall 63 on blocks 236 and project through wall openings 237 through which scraped spoil will enter the wheel 41 for removal by the spoil conveyor 105. The paired arrangement aforesaid provides effective scraping action regardless of the direction of wheel rotation and the helical disposition of the blades insures scraping action throughout the axial extent of the wheel 41.

As best shown in FIGS. 5 and 9, the mono-race bearing 38 may be disassembled from inside the shield and drawn rearwardly thereinto for repair or replacement. This is done by loosening and removing the various series of bolts 45, 46, 48. This permits axial withdrawal of the ring 44 which will then free the bearing 38 for similar axial withdrawal into the shield. After repair or replacement, the race can be restored to its assembled relationship in the reverse order of the steps just described.

FIG. 27 shows how the specific structure of the jack shoes 212 produces advantageous results in the apparatus of the invention. The coupling tongue 240 of jack piston rod 211 transmits thrust to the shoe pad 213 through pintle 217. The pad 213 is curved to match the curve of the casing plates 117. Jack thrust along axis 241 (coincident with the axis of piston rod 211) will intersect transverse axis X—X on which this thrust is transmitted to the pad 213 by bowed plates 214, 215. This thrust may be considered as applied to the pad 213 on points 245, 246, on axis X—X. But for the bowed arch or strut 214 the reaction thrust would be imposed on the pintle 217 on the axis 243. Unless balanced, such a reaction thrust would impose a turning moment on the shoe and in turn impose bending stress on the jacks 104 and their piston rods 211. However, in the disclosed shoe construction, the bowed plate 214 which carries coupling pintle 217 functions as a thrust balancing strut or arch spanning from near the ends of shoe pad 213 to transmit reaction thrust and impose this thrust on the pintle 217 on axis 244. Axes 243 and 244 are substantially symmetrically offset oppositely of axis 241, thus to balance the turning moment aforesaid. Accordingly, the thrust of ram 104 and the reaction thrust of the casing thereagainst is balanced to avoid the imposition of turning moment or bending stresses on either the casing flange or the ram and its piston rod.

I claim:

1. A tunneling machine comprising a rotary cutter wheel, blades on said wheel which fan out from the center of the wheel toward its rim, said blades having radially elongated edges, gates between adjacent blades, said gates having radially elongated edges complementary to the blade edges, and means for varying the spacing between the blades and gates to control the rate at which spoil flows into the wheel between the gap between the blades and gates.

2. The tunneling machine of claim 1 in which said blade edges face in both directions of wheel rotation.

3. The tunneling machine of claim 1 in which said blade and gate edges are disposed in axially overlapping imbricated relation.

4. The tunneling machine of claim 1 in which said blades have cutting edges which face in both directions of wheel rotation.

5. The tunneling machine of claim 1 in which said blades and gates are disposed in imbricated relation.

6. The tunneling machine of claim 1 in which said marginal skirt has an opening, a claw extendible through said opening and power means for working said claw into and out of said opening.

7. The tunneling machine of claim 1 in which said skirt has an opening, a claw in said opening, a pintle on which said claw is swingable, said claw having edges which face in both directions of wheel rotation to admit spoil into the wheel through said opening in both directions of wheel rotation.

8. A tunneling machine comprising a rotary cutter wheel having a generally hollow interior and different spoil excavating zones across its face, one of said zones comprising a generally open center zone through which spoil flows directly into the hollow interior of the wheel, another of said zones comprising a marginal skirt which blocks flow of spoil into the wheel through said margin, said center zone having radially elongated blades which fan outwardly across said open center and interdigited gates between adjacent blades to at least partially close the spaces between blades, and means for varying the spacing between said blades and gates to control the rate at which the spoil flows into the wheel.

9. A tunneling machine comprising a rotary cutter wheel having a marginal rim portion and a central portion bounded by said marginal rim portion, earth working blades in said central portion, an opening in said marginal rim portion and a claw extendible through said opening, said claw having edges respectively facing in opposite directions of wheel rotation, said claw being pivotally mounted in said opening to expose said edges beyond the said marginal rim portion of the wheel, power means for working the claw in and out of said opening and from side to side, and power means to turn the wheel in opposite directions of rotation to selectively excavate with either of said claw edges.

10. The tunneling machine of claim 9 in which said marginal rim portion comprises a frusto-conical skirt about said central portion and flaring rearwardly therefrom.

11. The tunneling machine of claim 9 in which said cutter wheel is rotatably supported within a shield, the center of rotation of the wheel being eccentric with respect to the centerline of the shield whereby to produce more cutting at the side of the shield toward which the wheel is offset.

12. The tunneling machine of claim 11 in which the shield has a thick skin at its side away from which the wheel is offset and a thin skin at its side toward which it is offset.

13. A tunneling machine comprising a shield having an annular bulkhead with an open center proximate the head end of the shield, a cutting wheel, a bearing supporting said wheel for rotation on said bulkhead, a motor reacting between the cutting wheel and the bulkhead to turn the wheel, counter torque thus imposed on the bulkhead tending to counter rotate the shield and bulkhead, a spoil conveyor having a spoil receiving end extending through the open center of the bulkhead into the wheel to receive spoil therefrom, said bulkhead having a radial and a thrust bearing independent of the cutter wheel on which the spoil receiving end of the conveyor is rotatably supported with respect to the bulkhead and remains in horizontal position regardless of any such counter rotation of the shield and bulkhead and on which the conveyor will be drawn forwardly with the shield as it is moved forwardly in the tunnel.

14. A tunneling machine comprising a shield having an annular bulkhead with an open center proximate the head end of the shield, a cutting wheel, a bearing supporting said wheel for rotation on said bulkhead, a motor reacting between the cutting wheel and the bulkhead to turn the wheel, counter torque thus imposed on the bulkhead tending to counter rotate the shield and bulkhead, a spoil conveyor having a spoil receiving end extending through the open center of the bulkhead into the wheel to receive spoil therefrom, said bulkhead having a radial and a thrust bearing on which the spoil receiving end of the conveyor is rotatably supported with respect to the bulkhead and remains in horizontal position regardless of any such counter rotation of the shield and bulkhead and on which the conveyor will be drawn forwardly with the shield as it is moved forwardly in the tunnel, said wheel having blades and gates and means for varying the spacing between the blades and gates to control the rate at which spoil flows into the wheel between the gap between the blades and gates.

15. A tunneling machine comprising a shield having an annular bulkhead with an open center proximate the head end of the shield, a cutting wheel, an axial thrust bearing supporting said wheel for rotation on said bulkhead, and means for releasably attaching the bearing to the wheel and to the bulkhead whereby release of said means frees the bearing for axial withdrawal as a unit from the vicinity of the wheel and bulkhead for repair or replacement thereof, said wheel having blades and gates and means for varying the spacing between the blades and gates to control the rate at which spoil flows into the wheel between the gap between the blades and gates.

16. A tunneling machine comprising a shield having an annular bulkhead with an open center, a cutting wheel, a radial and an axial thrust mono-race bearing supporting said wheel for rotation on said bulkhead, a plurality of motors mounted on said bulkhead and clustered about its open center, motion transmitting connections from said motors to the wheel to rotate the wheel and including a drive ring separate from said bearing and concentric therewith and offset radially outwardly from the bearing toward the shield wall, and means for releasably attaching said bearing to the wheel and bulkhead whereby release of said means frees the bearing for axial withdrawal as a unit from the vicinity of the wheel and bulkhead for repair or replacement thereof.

17. A tunneling machine comprising a shield having an annular bulkhead with an open center proximate the head end of of the shield, a cutting wheel, a radial and an axial thrust mono-race bearing supporting said wheel for rotation on said bulkhead, and means for releasably attaching the bearing to the wheel and to the bulkhead whereby release of said means frees the bearing for axial withdrawal as a unit from the vicinity of the wheel and bulkhead for repair or replacement thereof.

18. The tunneling machine of claim 17 in which said bearing has parts respectively fitting against rearwardly facing portions of the wheel and bulkhead whereby withdrawal of the bearing is rearwardly into the shield.

19. The tunneling machine of claim 1 in which the rotary cutter wheel is mounted on a shield, means for pushing the shield through the earth, a plurality of brake shoes mounted about the shield and power means to variably project one shoe or another to variably adjust the resistance of one side or another of the shield to its forward advance and hence control the direction of said advance.

20. The tunneling machine of claim 19 in which said shield has a bulkhead near its head end and a bearing on which the cutting wheel is supported on said bulkhead, said brake shoes being spaced axially from said bulkhead for accessibility from within the shield.

21. The tunneling machine of claim 19 in which said shield is provided with pockets recessed within the shield for said brake shoes, said brake shoes being retractable into said pockets and extendible radially from the shield under the pressure of said power means.

22. The tunneling machine of claim 21 in which said power means comprises for each shoe a motor and a toggle joint linkage interconnecting said motor and the brake shoe.

23. A tunneling machine for excavating through earth formations having different layers of earth stratum across the tunnel face, one said stratum comprising finely divided material and another stratum comprising gravel, said machine comprising a shield and a rotary cutter wheel mounted thereon, said cutter wheel having a face with different earth working implements thereacross to match said different strata, the implement matching the finely divided material stratum comprising cutter blades which fan out from the center of the wheel toward its rim and having elongated blade edges to cut spoil from said finely divided material stratum, said wheel having a generally hollow interior behind said edges to receive the cut spoil, the implement matching the gravel stratum comprising a marginal rim portion of the wheel having an opening and a claw extendible through said opening to scoop the gravel thereinto, and power means for working said claw in and out and from side to side to loosen boulders present in the gravel stratum.

References Cited

UNITED STATES PATENTS

| | | | |
|---|---|---|---|
| 3,301,600 | 1/1967 | Pirrie et al. | 299—33 |
| 3,307,876 | 3/1967 | Akkerman | 299—33 |
| 899,606 | 9/1908 | Murphy | 37—21 |
| 1,530,768 | 3/1925 | Haag | 61—85 |
| 1,554,723 | 9/1925 | Hamilton | 299—31 |
| 1,569,787 | 1/1926 | Robertson | 37—189 |
| 1,948,707 | 2/1934 | Gilman | 61—85 |
| 3,075,359 | 1/1963 | Clark | 61—85 |
| 3,232,670 | 2/1966 | Robbins et al. | 175—267 |
| 3,266,257 | 8/1966 | Larrouze et al. | 299—31 |
| 3,309,142 | 3/1967 | Winberg | 299—33 |

FOREIGN PATENTS 934,996    8/1963    Great Britain.

ERNEST R. PURSER, *Primary Examiner.*

UNITED STATES PATENT OFFICE
CERTIFICATE OF CORRECTION

Patent No. 3,382,002                                                  May 7, 1968

John R. Tabor

It is certified that error appears in the above identified patent and that said Letters Patent are hereby corrected as shown below:

Column 12, lines 23, 26, 28 and 32, claim reference numeral "1", each occurrence, should read -- 8 --.

Signed and sealed this 14th day of April 1970.

(SEAL)
Attest:

Edward M. Fletcher, Jr.                                WILLIAM E. SCHUYLER, JR.
Attesting Officer                                            Commissioner of Patents